United States Patent
Jonsson et al.

[19]

[11] Patent Number: 5,757,286
[45] Date of Patent: May 26, 1998

[54] METHOD AND A DEVICE FOR THE REGISTRATION OF THE MOVEMENT OF A VEHICLE

[75] Inventors: Rune Jonsson; Folke Isaksson, both of Linköping, Sweden

[73] Assignee: Saab-Scania Combitech Aktiebolag, Jonkoping, Sweden

[21] Appl. No.: 556,898

[22] PCT Filed: May 27, 1994

[86] PCT No.: PCT/SE94/00503

§ 371 Date: Jul. 23, 1996

§ 102(e) Date: Jul. 23, 1996

[87] PCT Pub. No.: WO94/28377

PCT Pub. Date: Dec. 8, 1994

[30] Foreign Application Priority Data

May 28, 1993 [SE] Sweden ................... 9301842
Sep. 30, 1993 [SE] Sweden ................... 9303202

[51] Int. Cl.[6] .................................................. G08G 1/017
[52] U.S. Cl. .......................... 340/937; 340/928; 340/942; 348/148; 348/149
[58] Field of Search .................................. 340/928, 933, 340/937, 942; 348/139, 140, 148, 149, 125, 129, 113, 47, 118, 143, 42, 46; 364/436

[56] References Cited

U.S. PATENT DOCUMENTS

| | | | |
|---|---|---|---|
| 4,075,632 | 2/1978 | Baldwin et al. | 340/870.01 |
| 4,104,630 | 8/1978 | Chasek | 342/44 |
| 4,242,661 | 12/1980 | Henoch et al. | 340/994 |
| 4,303,904 | 12/1981 | Chasek | 340/825.54 |
| 4,555,618 | 11/1985 | Riskin | 235/384 |
| 4,922,339 | 5/1990 | Stout et al. | 340/937 |
| 5,101,200 | 3/1992 | Swett | 340/937 |
| 5,204,675 | 4/1993 | Sekine | 340/933 |
| 5,235,416 | 8/1993 | Stanhope | 348/139 |
| 5,253,302 | 10/1993 | Massen | 348/47 |
| 5,343,927 | 9/1994 | Brady et al. | 348/148 |
| 5,537,110 | 7/1996 | Iida et al. | 340/937 |
| 5,554,983 | 9/1996 | Kitamura et al. | 340/937 |
| 5,568,406 | 10/1996 | Gerber | 340/937 |

FOREIGN PATENT DOCUMENTS

| | | |
|---|---|---|
| 60-10112(A) | 1/1985 | Japan . |
| 777427 | 11/1980 | U.S.S.R. . |
| 2219881 | 12/1989 | United Kingdom . |
| WO90/14640 | 11/1990 | WIPO . |

*Primary Examiner*—Brent A. Swarthout
*Assistant Examiner*—Vam T. Trieu
*Attorney, Agent, or Firm*—Lowe, Price, LeBlanc & Becker

[57] ABSTRACT

A device and method for registering the displacement of a vehicle using a video camera device located above the ground and including a pair of cameras spaced parallel to the ground and directed to record on their respective image planes areas of the ground which overlap at least partly whereby there are produced in the cameras pairs of stereo records. These pairs of stereo records are utilized in an image processing of the mutual locations of contrast fields within the contour of the vehicle for comparison. The contrast fields are located at different height levels above the ground so that evaluation of at least one of the fields may be used in the image processing as an indicator in tracking the displacement of the vehicle for successive positions of displacement to be registered.

6 Claims, 4 Drawing Sheets

METHOD AND A DEVICE FOR THE REGISTRATION OF THE MOVEMENT OF A VEHICLE

TECHNICAL FIELD

The present invention relates to a method and device for registering the successive displacement of a vehicle. A foreseen and important area of application is the registration of the displacement of a vehicle in a road toll facility from a place of entry to a place where recording of the number plate or other characteristic of the vehicle can take place.

BACKGROUND

It is known to arrange road toll facilities for automatic fee debiting, see for example U.S. Pat. No. 4,104,630 and U.S. Pat. No. 4,303,904.

Thereby, it is understood that the majority of vehicles that pass the road toll station are provided with a receiver-transmitter unit for radiowaves, a so-called transponder. The road toll facility comprises an arrangement by which communication by radiowaves can take place with passing vehicles. This arrangement comprises transmitter and receiver, a transceiver, for the radiowaves by means of which equipment payment and debiting operations can be effected for the passing vehicles that are provided with said transponder. For this technique compare U.S. Pat. No. 4,075,632 and U.S. Pat. No. 4,242,661 for example.

However, it may occur, that the toll facility is passed by vehicles which are not provided with any transponder and therefore cannot be identified by means of the radiowaves. For identification of such vehicles, if these attempt at passing the toll facility without paying toll, the toll arrangement is provided with camera devices for image registration of the number plates of the vehicles in question for search and post-debiting. Such need be performed not only of vehicles that lack a transponder. If pre-payment is understood and sufficient means is lacking or if an approved payment operation cannot be performed for any other reason despite the presence of a transponder, post-debiting shall also be performed.

The most advanced system for road tolls of this kind is adapted to a great flow of traffic in free formation. In such an arrangement it will be possible that the vehicle is displaced a certain distance from the time when a registration has been possible to make of whether the vehicle is identified through microwaves or not and until the recording of the number place can occur.

During this displacement a differentiating must be maintained between such vehicles for which search and post-debiting shall take place, and such for which payment has been assured by means of a transponder. This requires that the toll facility is provided with an equipment for the registration of the successive forward displacement of the vehicle, so that it is ensured that the image is registered for the correct vehicle, i.e. a vehicle which on passing the road toll has been established to have dissatisfactory payment status. This positioning check shall thereby be effected while several vehicles travel in a free flow with possible lane changes when passing through the road toll facility. The check shall be possible to perform of the vehicle at full speed whereby a very short time is available.

In order to perform this positioning check during the displacement in the toll facility and through the recording site it has been suggested to use induction loops in the roadway. With the aid of these it is possible to detect the displacement of the metal mass of a vehicle and follow the displacement of the vehicle in the direction of travel and also detect possible side displacements.

Such a device is however expensive and difficult to install as it must be countersunk into the roadway. It is also difficult to render it sufficiently selective, so as to in effect guarantee that no confusion between vehicles moving in a complex movement pattern at high speed occurs. Moreover, certain vehicles such as motor cycles can be difficult to register at all.

DESCRIPTION OF THE INVENTION

In the invention, video cameras are used for the registration, arranged at a distance above the roadway. In the image planes of the cameras registered. In an image processing computer one or more contrast fields in the recording of the vehicle is/are connected to its/their identity in an image processing not via the displacement of this or these fields in the image plane in the camera a registration of the displacement can take place successively. By programming an image processing the position of a recording field of a camera, when the vehicle has reached this field, an exposure of the number plate can take place through the activation of the recording camera. The vehicle, whose displacement is tracked, has during passing within the road toll facility been registered with respect to payment status, so that after entry those vehicles which have dissatisfactory payment status can be traced and recorded.

When proceeding through such a process for the successive positions of displacement, there are disturbances that must be eliminated in order to achieve a safe registering. These disturbances relate to phenomena such as shades, wandering fields of light and reflections in the roadway etc. According to the invention these disturbances are eliminated in that, for the detection of the momentary positions of the vehicle, contrast fields of the vehicle are used that are present at a certain distance from the roadway, for example the contour of the roof. Selection of and locking at such a field take place in a process in which stereo records from two cameras arranged in a pair are processed in an image analysing process. By excluding in this way what occurs on and immediately above the ground a safe tracking of the vehicle is achieved during the whole of its displacement until recording occurs.

DESCRIPTION OF THE DRAWINGS

In the accompanying drawings a preferred embodiment of the invention is illustrated, wherein.

PREFERRED EMBODIMENT

Figure 1:
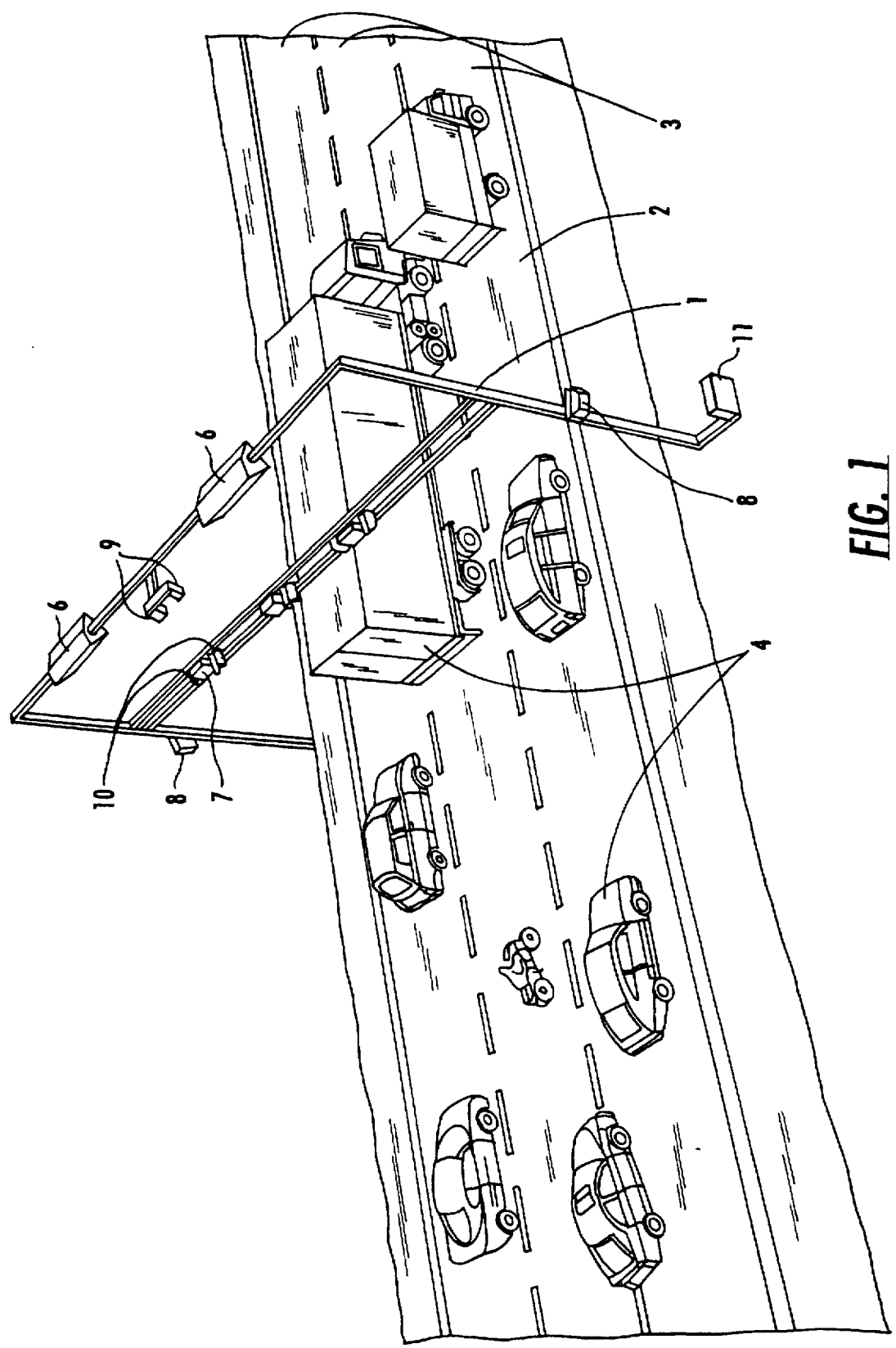
FIG. 1 shows in perspective a road toll arrangement.

According to FIG. 1 an automatic road toll facility according to the invention is provided with a gantry 1 which extends above a road 2, which has three lanes 3 in which vehicles 4 of different kinds can proceed through the portal-like gantry 1. The traffic is not limited to keeping in a lane but is allowed to perform lane changes and over-takings. It is thus a free-flow system, which as little as possible shall disrupt the traffic flow.

On the gantry, there are attached two lights fittings 6 and a number of transmitter and receiver units 7 for microwaves, three of which are shown here, including antennae for these. In addition, there is on either side a video camera 8, directed at the approaching traffic flow to register vehicles which unpermittedly are driven on the verge. In addition, at the top center of the gantry a pair of video cameras 9 are shown, directed downwards at the traffic flow. Alternatively, several such pairs of cameras can be arranged. Furthermore, cameras 10 in three pairs of video cameras 10 are directed towards and away from the traffic flow. These pairs of cameras are shown located approximately at the centre of the respective lane 3. In each pair one of the cameras is directed against and one along the direction of the traffic flow.

All this equipment is connected to a central facility 11 for the control of same and for processing recorded data. This central facility is in turn connected to a central net for further communication.

Figure 2:
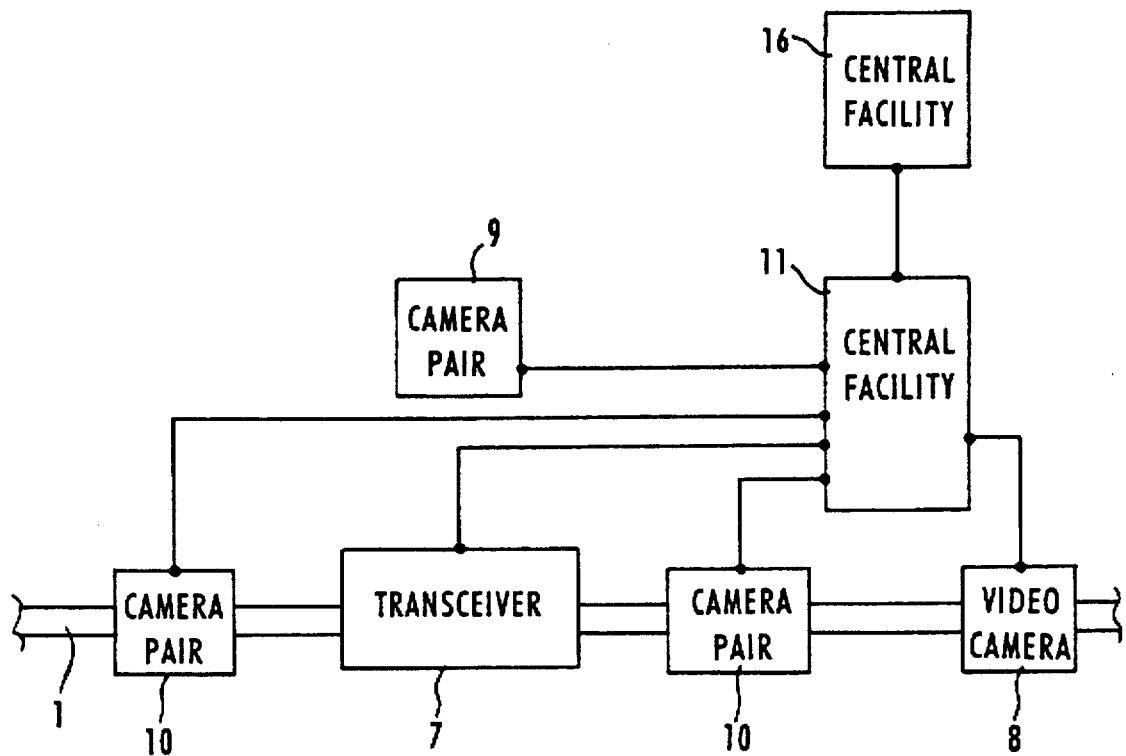
FIG. 2 shows a block diagram for the main functions of the arrangement.
Figure 2:
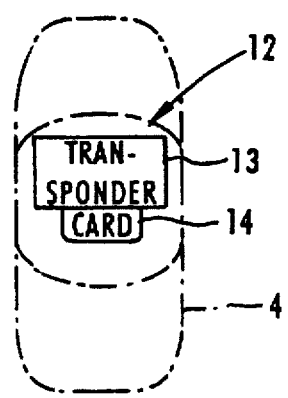

The main functions and function units of the arrangement are evident from the bock diagram in FIG. 2. Therein, 12 designates the equipment understood to be provided in the majority of vehicles 4.

Such an equipment can be a transponder unit 13, which is arranged to pick up microwaves and transform them into an answer signal comprising information for the identification of the vehicle, and in addition, an intelligent card for transmitting data via the transponder, which data in addition to certain identification data, can consist of data regarding payment conditions (if debiting shall occur or if pre-payment via a pay card 14, smart card, has been made).

Other elements in the block diagram relate to the stationary equipment. On the gantry there are located the transmitted and receiver equipment 7 for microwaves, video cameras 8 and the camera pair 9 as well as the video cameras 10, which are all identified by the same numbers in the block diagram. Other elements belong to said equipment with which the equipment on the support communicates. This equipment can comprise a unit 11 for checking the transmitter and receiver equipment 7 and which controls the debiting of vehicles which are provided with the equipment 12.

In addition, there is said equipment for checking vehicles which are not provided with any unit 12–14 and for which there is a need for identification in a different way, and examination for post-debiting. This equipment comprises the camera pair 9 for the detection and tracking of vehicles which lack the correct equipment 12, and video cameras 10 (only two of which are shown) for recording the number plate of the vehicles that shall be checked particularly. Video cameras 10 are connected to the unit 11 for controlling the exposure of the vehicles that shall be checked particularly and for controlling registered video records, and possible compression and storing of same. These records can be communicated to a central facility for post-processing in connection with search and post-debiting of vehicles that have passed without paying.

Broadly, except for the arrangement with the cameras 9, this system corresponds to what has been stated in the introduction as known. However, there is within the system a part solution that relates to the system for the successive position registration of vehicles between the place of entry into the road toll facility and registration of the identification images. This part solution forms the basis for the subsequent claims, and shall be described in the following.

As mentioned, registration of debiting shall take place, in the ordinary case through subtraction from a pre-paid card, smart card, when the vehicle passes the road toll facility. This case leads to the following operational steps:

The Vehicle approaches—the microwave transmitter is activated.

Command is transmitted—the transponder of the vehicle answers—the microwave transmitter registers the position of the vehicle and checks payment status.

Debiting occurs—through activation from the transponder the debiting is registered in the vehicle.

Reporting to the central unit of performed transaction.

If however the vehicle is not equipped for automatic fee debiting or does not have approved payment status, means lacking on the card or an account not having been approved, the vehicle must be registered through video recording of its number plate. This shall occur when the vehicle is in a certain position, the recording site, relative to the respective cameras 10. From the moment when the position of the vehicle has first been registered and until the vehicle has come in position for recording, it shall be tracked. Such tracking or successive position registration must be possible to perform, irrespective of the speed of the vehicle, changes in speed an changes in the direction of travel. Recording for post-processing shall only, under maintained identification, be registered for such vehicles for which no approved fee debiting has been performed by means of the described interaction between the microwave transmitter and the vehicle equipment with its transponder.

The successive position registration is performed with the aid of the video cameras 9, the pair of cameras co-operating with an equipment for image processing. The operational sequence for the camera units and the image processing equipment comprises the following steps:

Activation occurs either via the microwave transceiver and/or directly in that the vehicles enter the image field of any one of the cameras 9.

The successive position registration by means of the cameras is initiated.

The position, such as it appears from the position in the image field of the two co-operating cameras, is correlated to one in the same moment, with the aid of the position that the microwave transceiver can register for vehicles provided with a transponder.

If through the microwave transceiver approved payment is registered, the system is made passive for the successive position registration of the vehicle in question.

If however approved debiting could not be performed, the successive position registration of the vehicle in question continues.

Along the contour of the registered vehicle a marker is placed on the spot where a number plate is supposed to be located—possibly a marker can be placed both in the position of the front number plate and of the rear number plate.

In the image field there is a fixed marking for the image field of the recording camera or cameras.

When the vehicle marker has reached the marker of the recording camera it is activated for the recording of the number plate or plates of the vehicle.

The recording can be connected to a registration of data such as time and place and data regarding the vehicle such as its type (passenger car, bus, truck, motor cycle).

The produced records are stored for processing, so that post-debiting of the toll and possible fine can be effected.

According to the here given flow scheme only the vehicles that by means of microwave communication have been stated not to have approved payment status are recorded. This means that the vehicle must be tracked while the payment and checking operation is performed upto the recording site. This gives a relatively extended toll facility area since the payment operation requires a certain time during which a fast vehicle travels a relatively long distance. To this distance adds the distance that is required for the recording site. In the whole distance, tracking must be performed which gives a corresponding extended monitoring area for the video cameras.

In an alternative solution, the number plates of all incoming vehicles are recorded and tracked thereafter during the payment operation including the checking operation of payment status. The recorded vehicles can hereafter be separated into two groups, firstly such that can make the correct payment and secondly such that cannot. For the latter the recording of the number plates are given a special marking which indicated that post-debiting shall be performed. Preferably, this marking occurs in that only these records are registered finally while all others are deleted from the storing means, which can be a magnetic disc for example. By performing the payment/checking and recording operation in this way along the same distance, the total distance for the operational area of the toll arrangement is reduced.

Which one of these two described operational sequences is chosen does not affect the main function of tracking the vehicle by means of the camera pair 9.

Even if recording the number plate or other characteristic is understood here, it does not exclude that recording can be performed in any other way, for example by reading the number code of the plate or any other code.

In the following, the image processing shall now be described from one time when both video cameras in the pair 9 are activated until the successive position tracking has been concluded when the payment status of the vehicle has been established and possibly registered.

In the successive position registration, by electronic processing of the images of the video cameras only, there are certain problems, which must be eliminated. The major problem is how the contour and contrasts within the vehicle could be separated from other contours and contrasts in the image field, which do not represent this particular vehicle. Such contours can appear through shadows from objects in the surroundings and above all movable shadows from simultaneously passing vehicles. In addition, there may be reflections, especially at rainy weather. Such phenomena appear on or immediately above the roadway, while every vehicle that shall be registered has a certain height. Consequently, only the contours of objects that are present with any portion at a certain height above the roadway are recorded and tracked, said height however not being in any way predetermined; vehicles of many different kinds can pass the road toll facility. How this is achieved is evident from the following, wherein FIGS. 3–6 are referred to.

Figure 3:
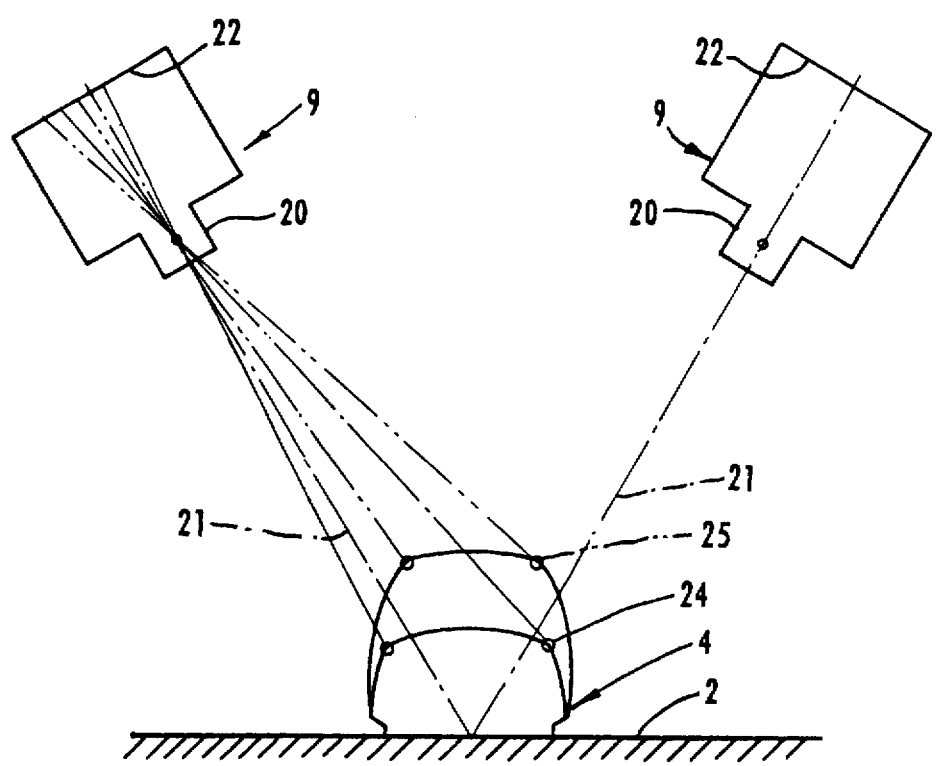
FIG. 3 shows schematically in arrangement of two video cameras for said registration of the successive displacement.

In FIG. 3 it is shown, in a view seen in the horizontal direction, a portion of the road toll gate in FIG. 1. For identical functional parts the same designations have been used; thus represented are the road toll gantry 1, the roadway 2 and a vehicle 4, as well as two video cameras 9, which jointly from said unit. FIG. 3 is more schematic than FIG. 1 and does not have the same proportions.

The two video cameras are directed so as to overlap each other's image field at least in part. They are located at a distance from each other and the overlapping is achieved in that they are directed with their objectives 20 towards each other. Suitably, they are so directed that their respective central axes 21 through the objectives meet each other in the roadway 2. From this follows that in the image planes 22 of the two cameras, a stereo record appears, i.e. two records that show the object in question from two different angles.

By such recording with cameras at a distance from each other and with overlapping image fields, an imagined plane can be laid through the respective objectives, which two planes intersect in a determined line at a distance from the cameras. In the arrangement shown in FIG. 3 it is shown for the left camera that this plane is located in the central axis 21 of the objective, and thereby forms a centre line to the image plane 22. The right camera 9 is directed in the same way. The setting of the cameras is such that these central planes hit each other in the roadway 2 right at the centre between the cameras (the imagined planes are perpendicular to the plane of the paper). Hereby, the records produced by the two cameras of the roadway and only of it, will correspond almost completely.

In positions above the roadway, however, the records in the two cameras differ more and more from each other the higher above the roadway the recorded portion is located. This is shown by additional lines at the left camera. So it is shown, how the contour of an area 24, which shall mark the front or near portion of the vehicle (on a saloon model), will displace itself relative to the plane 21 of the central axis. The portion 25, which is intended to designate the roof of the vehicle will be placed even more out of centre relative to the central axis 21. In the other camera the same phenomenon appears, but here the displacement occurs relative to the central axis in the opposite direction. Recording in this way is called stereo recording.

Figure 4:
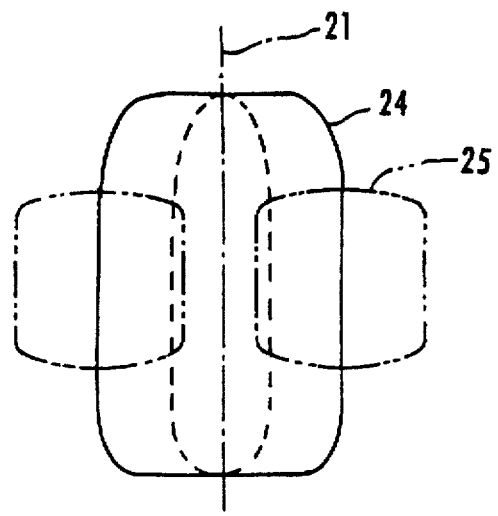
FIG. 4 shows two superimposed stereo records.

This is illustrated in FIG. 4 in which it is shown how a conceived image produced by superimposing the records of the two cameras would look. It is evident that the contours 24 have been displaced outwards away from each other and the contours 25 have been even more displaced from each other. By processing the image signals from the two cameras, which is suitably performed digitally, contours can be detected which are located at a considerable distance from each other, i.e. contours of portions which are located at a certain height above the roadway. Suitably, larger areas are selected high up, suitably the roof of the vehicle or in case of trucks the upper surface of the cargo. By selecting in this way by means of stereo recording a high portion, at a certain height, of a vehicle for a detection of its position, the effect of said disturbances by shadows and reflections in the plane of the roadway can be eliminated.

Figure 5:
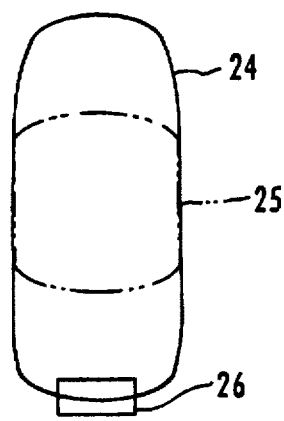
FIG. 5 shows these two stereo records brought together.
Figure 6:
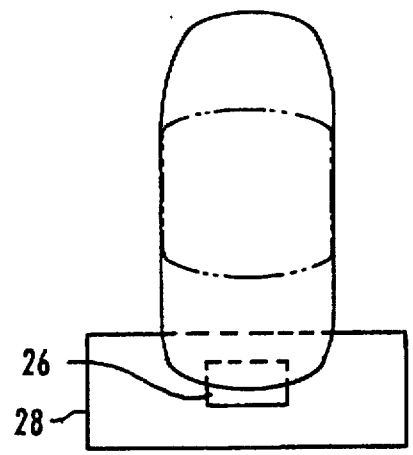
FIG. 6 shows a position of displacement of the vehicle other than that shown in FIG. 5, that is when the vehicle has reached the recording site.

In the next step of the image processing the contours are joined with a special marking of the contour 25, which has been selected for positioning. This is illustrated in FIG. 5. By tracking the marked contour 25 the successive position displacement of the vehicle can be successively registered through further image processing.

In order to record the place on the vehicle where the number plate is attached, a marker 26 is attached to this place. By marker it is here meant a field in a determined position relative to the contour 25, which in the image processing is used for the successive registration of the position of the vehicle. As mentioned, the marker is placed over the external contour 24 of the vehicle and encircles the area where the number plate is supposed to be located. In FIG. 5 it is suggested that the rear number plate of the vehicle is intended. One of the cameras in the pair shown in FIG. 1 at 10 10 that are directed in the direction of travel of the passing vehicles can thus catch the rear plate within its image field. If desired, the front number plate can alternatively or additionally be recorded. In FIG. 1 a further arrangement of recording cameras is shown. In this case, a marker is also positioned at the front contour line of the vehicle.

At the toll facility shown in FIG. 1 it is understood that the recording of both the front and rear number plates of the vehicle shall occur, which is evident in that the cameras 10 have been stated to be separated in forward-directed and backward-directed cameras, relative to the direction of the traffic flow.

The marker can be given the shape of a field or frame inserted as a part of the recording in the image field of the camera and movable along with the contour of the vehicle during its displacement. Alternatively, in the image processing program the marker can be defined with coordinates starting out from the contour 25.

In the image field of the camera there is one additional or several markers 28. With rigidly mounted cameras, the markers are located at fixed places in the image field. Similar to the marker 26, the marker 28 can be inserted in the image field or expressed as fixed coordinates for example. Each marker 28 designates an area of recording for the recording cameras 10.

During the successive displacement of the vehicle, its recorded contours are also displaced through the locking of the image processing computer to the contrast field within the selected contour 25 by the image processing computer. This, eventually, causes the marker 26, which is fixed to the vehicle contour, to be displaced in the image field into the area for the respective marker 28, which represents the image field of a recording camera 10. A recording position has thereby been obtained. This is detected by the computer, and activation of the recording camera occurs, so that an exposure of the number plate of the vehicle is made.

The produced image is stored for example on a computer disc or is transmitted to the central computer 16 for storing.

In the arrangement shown in FIG. 1 according to the secondly mentioned alternative, recording of the front number plate is made in the place where the activation of the microwave transceiver 7 occurs and the rear plate is recorded after the vehicle has passed the gantry 1. The recording shall then in the first case be made when the front number plate 26 of the vehicle passes the marker for one of the cameras 10 directed at the traffic flow and the recording of the rear number plate when its marker passes the marker for the cameras directed along the direction of the traffic flow.

Later, a reading of the stored records and post-debiting of the vehicle fee and possible fine is effected. Suitably, each record is connected to certain data produced in connection with the process, such as time and place, the status of the vehicle, provided with or lacking transponder, and also vehicle type.

Checking the vehicle type can be of interest for determining the amount of the fee. Although the vehicle type should be possible to read out, with the aid of the number plate, from the authority vehicle register, a special detection of the vehicle type provides a possibility to check that any exchange of number plates between different vehicles has not occurred.

For detecting which category, passenger car, bus, truck or motor cycle, the vehicle in question belongs to, the equipment for the successive position displacement can be used.

This equipment provides, as described, a reading of the height conditions of the vehicle through indication by means of the contour displacements between the two stereo records, compare FIG. 4. The greater the displacement, the higher the portion in question of the vehicle. By using the degree of this displacement in the image processing, a height graph for the vehicle can be produced. This will for different categories of vehicles have a characteristic appearance and dimension. So, a passenger car of modern saloon-type has a front and a rear lower portion, the bonnet and the luggage boot, and inbetween a higher portion, the passenger space. A bus, on the other hand, has usually an almost vertical front and rear portion and inbetween a relatively plane roof. With such shapes as a basis the recorded height graphs can be detected and fitted into a vehicle category. Other image elements as well, created through in different image fields within the vehicle contour can be used for determination of the vehicle category.

The method according to the invention of tracking and detecting the successive displacement of a vehicle by means of video recording comprises the recording of stereo images and by comparing these establishing a contour of the vehicle that is present at a distance from the roadway on which the vehicle moves. This contour or any part of same or additional contours are thereafter used as the image part to which locking occurs and through whose the displacement in the image field the vehicle movement can be registered.

In FIG. 3 the principle of the stereo recording is shown in a symmetrical arrangement. The cameras 9 are so directed that the central axes 21 of the objectives hit each other in a mutual point in the roadway 2. The vehicle 4 in turn is symmetrically located relative to this point. Especially the latter should occur more seldom in reality. The vehicle can have different positions sideways within the operational field of the cameras. This leads to a displacement of the vehicle contour within the image field. In spite of this, the described main principle for position registration can be used. This is true even if the camera arrangement should not be entirely symmetrical or if any other axis through the objectives than the central axis should be used as the axes of reference which shall intersect each other in the roadway.

The described image processing has been designated as to its main steps. Further steps can be added such as correction of the real image on the image field of the camera, which can be distorted, into a correct shape on the image field of the camera. Other processing steps can also be added without deviating from the basic principle.

In a camera pair several vehicles can be tracked and registered simultaneously. If change of lanes occurs, the vehicle must despite this fact be possible to track. Thereby, it is either required that one camera pair covers all the lanes or that the image processing allows the transfer of a vehicle image between several camera pairs. In the former case the arrangement can be reduced to one camera pair if the whole roadway is covered by it.

At the first designated alternative it was supposed that only the vehicles that shall be searched, are tracked and recorded. However, deletion of the record can be performed at any step of the process, and according to the second alternative all vehicles can be tracked and recorded but storing only images of vehicles that shall be searched for.

For selecting such images that shall be post-processed, the transceiver equipment 7 must work with the detection of vehicles provided with a transponder. By means of several antennae the position of a vehicle entering the operational area of the toll facility can be estimated. This is used for correlating the vehicle identification in the microwave and camera systems, respectively. A preferred method of operation is that the cameras 9 catch all vehicles, when they enter the image field. Simultaneously, the microwave system performs its checking and debiting operation. When acceptance of this has been registered, which provides that the vehicle has a unit 12, the momentary position of the vehicle is calculated by the microwaves. This position can now be correlated to the position of the corresponding vehicle in the image processing. Thereby, this vehicle can be eliminated from the search process.

Finally, it shall be mentioned that the cameras 8 at the verge are suitably arranged to record all vehicles that are driven on the verge of the road. Such traffic should always be considered unpermitted if it is not a case of working vehicles and certain official vehicles.

We claim:

1. A method of registering the displacement of a vehicle (4) on a ground plane (2) for registration of successive displacement positions thereof, said vehicle defining a plan view contour, said method comprising the steps of:

(a) disposing above said ground plane and vertically spaced therefrom, a video camera device comprising cameras (9) spaced in a direction substantially parallel to said ground plane (2);

(b) directing said cameras (9) to record on their respective image planes (22) images of an area of said ground plane (2) which at least partially overlap to produce in the camera pairs of stereo records;

(c) detecting from images of pairs of stereo records contrast fields within the contour of said vehicle;

(d) processing the mutual location of said contrast fields within said contour of said vehicle in said images to identify by substantial displacement therebetween a contrast field at a substantial distance above said ground plane; and (e) using said contrast field identified as being at a substantial distance above the ground as an indicator to track displacement of said vehicle.

2. A method according to claim 1 including the steps of:

establishing with respect to said video camera device and said ground plane an indicia recording site (28);

in said processing, establishing with respect to one of said contrast fields (25) and the contour (24) of the vehicle (4) with which said contrast field (25) is associated, an indicia marker position (26); and reading said indicia when said indicia marker position (26) reaches said indicia recording site (28).

3. A method according to claim 1 including the steps of:

establishing for a vehicle (4) whose displacement is being registered a height contour graph based on relative vertical displacement of detected contrast fields (24, 25) of said vehicle (4);

comparing said contour graph with predetermined contour graphs of various types of vehicles; and determining from said comparison the type of vehicle (4) whose displacement is being registered.

4. An apparatus for registering the displacement of a vehicle (4) moving on a ground plane (2) for registration of successive displacement positions thereof, said vehicle defining a plan view contour, said apparatus comprising a video camera device mounted above said ground plane and spaced vertically therefrom; said camera device including cameras (9) spaced in a direction substantially parallel to said ground plane (2) and being directed in such directions as to record on their respective image planes (22) images of an area of said ground plane (2) which at least partially overlap to produce in the cameras pairs of stereo records; an image processor detecting from processed images of pairs of said stereo records contrast fields within the contour of said vehicle and processing the mutual location of said contrast fields in said images to select by the vertical displacement thereof a contrast field at a substantial distance above said ground plane, and using said selected contrast field as an indicator to track displacement of said vehicle relative to said video camera device.

5. An apparatus according to claim 4 wherein said apparatus is associated with a road toll facility for effecting automatic fee registration of passing vehicles, said video camera device being arranged to register the successive positions of displacement of the respective vehicle when passing the operational area of the toll facility; means for recording an identification indicia of the vehicle including a video camera (10) arranged to record said indicia; said image processor responsive to information from said video camera device activating said video camera (10) for recording said indicia when said indicia reaches a pre-established recording site.

6. An apparatus according to claim 5 including wireless transponder equipment associated with said road toll facility and with at least certain vehicles for effecting toll debiting and account status checking with respect to vehicles with which said wireless transponder equipment is associated, said wireless transponder equipment being connected to said apparatus for registering the displacement of a vehicle so that a selection is made in the registering of a vehicle between debiting by means of said wireless transponder equipment or by means of said video camera device and associated processing.

* * * * *